Dec. 4, 1962  H. STRAUB  3,066,781
ELECTROMAGNETIC FRICTION CLUTCH HAVING
STATIONARY SOLENOID MAGNET
Filed May 22, 1959

Inventor:
HERMANN STRAUB by: *Albert M Zalkind*
ATT'Y

United States Patent Office 3,066,781
Patented Dec. 4, 1962

3,066,781
ELECTROMAGNETIC FRICTION CLUTCH HAVING STATIONARY SOLENOID MAGNET
Hermann Straub, Friedrichshafen am Bodensee, Germany, assignor to Zahnradfabrik Friedrichshafen, Aktiengesellschaft, Friedrichshafen am Bodensee, Germany
Filed May 22, 1959, Ser. No. 815,208
Claims priority, application Germany May 24, 1958
2 Claims. (Cl. 192—84)

This invention relates to friction clutches and more particularly to friction clutches of the electromagnetic type.

It is an object of the invention to provide an electromagnetic clutch, in which the solenoid does not require collector rings.

It is another object of the invention to provide a construction wherein the solenoid is carried via needle bearings on a drive shaft.

It is a further object of the invention to provide an arrangement wherein magnetic flux lost through the drive shaft is maintained at a minimum.

Briefly, the invention comprises a ring-like electromagnet, i.e., a solenoid, mounted on a drive shaft through needle bearings, wherein the needle bearings are small and provided in as few a plurality as possible. By providing small needle bearings and as few as possible, the magnetic path is maintained at minimum reluctance.

My invention will now be described in detail in conjunction with the appended drawing in which.

Figure 1:
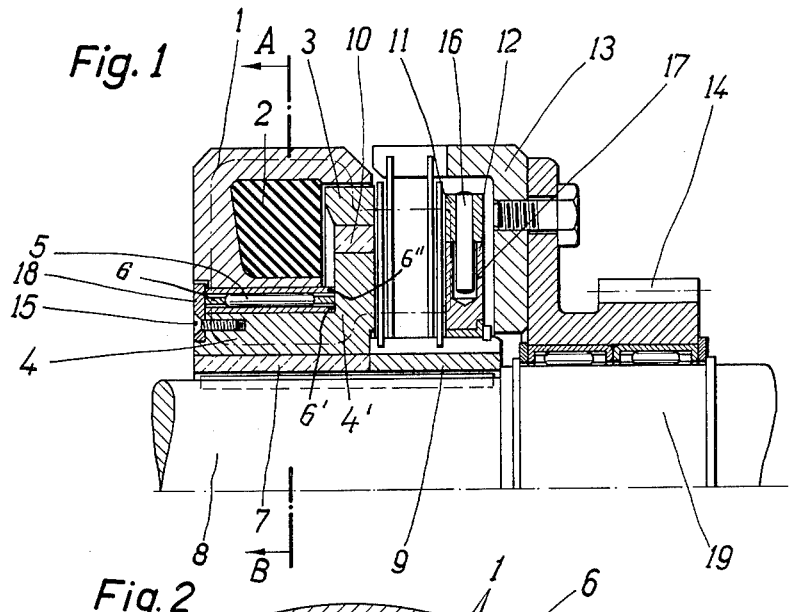
FIG. 1 is a longitudinal cross-section showing an electromagnetic clutch, incorporating the features of the invention, mounted on a drive shaft.
Figure 2:
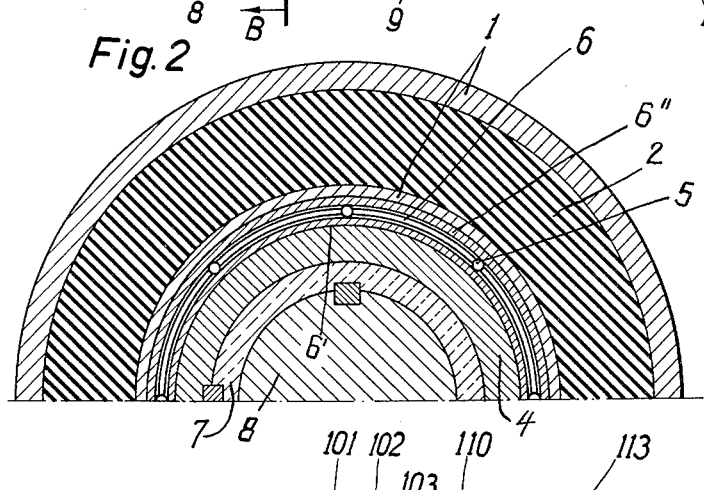
FIG. 2 is a section through A—B of FIG. 1.

Referring now to FIGS. 1 and 2, a drive shaft 8 is disclosed which carries a toroidal magnet body 1 having the solenoid winding 2. A ring-like member 3 is provided which is substantially disposed within the body 1. The member 3 has a hub 4 which carries the magnet body 1 via roller or needle bearing device 5. The needles or rollers of the bearing are carried within slots (not shown in detail) of a cage 6, the cage 6 being made of soft iron.

As will be noted from FIGS. 1 and 2, there are provided bearing races or sleeves 6' and 6". The inner race 6' is carried on the hub 4 and the outer race 6" is disposed intermediate the needle bearings and the magnet body 1. These races are of magnetically permeable material.

The cage 6 and the aforementioned races are retained between the hub 4 and magnet body 1 by a ring 18 secured as by bolts 15 to the magnet body. The member 3 is made of magnetic permeable material and is carried on a flange 4' which is integral with the hub 4. A non-magnetic spacer or ring 10 is disposed intermediate the ring 3 and flange 4'. Thus the unit 3—4'—10 forms a guide for magnetic flux shown by the dot-dash line.

Cage 6 carries the fewest possible number of needles or rollers 5 required to maintain and support the radial load of the magnet body 1 and solenoid 2. By providing the fewest possible needle bearings (8 shown), and by effecting a very small peripheral air gap between the cage 6 and the races 6' and 6", a condition for transmission of most flux is effected. Further, the flux path is concentrated withing the magnet body 1 and the hub 4 by virtue of mounting the hub 4 on a non-magnetic sleeve 7, which is keyed to the shaft 8 and secured to the hub 4. Thus, the hub 4 rotates and supports magnet body 1 via needle bearing 5.

Keyed to shaft 8 is the clutch sleeve 9 which is preferably of non-magnetic material to prevent magnetic leakage, which clutch sleeve carries inner friction disks (not numbered) keyed thereto in a conventional manner, which co-act with outer friction disks (not numbered) keyed to the clutch ring 13. Clutch ring 13 is bolted, as shown, to the gear 14 carried via needle bearings, as shown, on shaft section 19.

An armature comprising the ring 11 and disk 12 is carried on sleeve 9, the ring and disk being secured together as by pins 16. The pin, or pins, 16 is firmly frictionally held within the ring 11 and protrudes into the bore 17 of the disk 12, having a predetermined amount of play in the bore so that slight relative axial movement between the ring 11 and the disk 12 is possible. The purpose of the two-part armature is to compensate for the greater wear which would normally occur at the outer portion of the laminations. This is conventional construction.

It will be noted from FIG. 1, by following the dot-dash line, that the flux makes a complete loop around the solenoid 2 through the magnet body 1 and the hub 4, including the outer member of the element 3, and completes its path through the friction disks and the armature elements 11 and 12. It will further be noted that no flux leaks into the shaft 8. Thus, by virtue of providing the soft iron cage 6, a highly permeable material, with as few gaps in it as possible, meaning as few slots as possible for holding the needle bearing 5, and effecting as small a gap as possible between the cage 6 and the bearing races disposed inwardly and outwardly of the cage, an efficient magnetic flux path is effected through a stationary magnet body. The construction thus avoids the necessity for the relatively complex construction required by collector rings together with the electrical contact problems which such construction involves, where a rotary type of magnet body is used.

Figure 3:
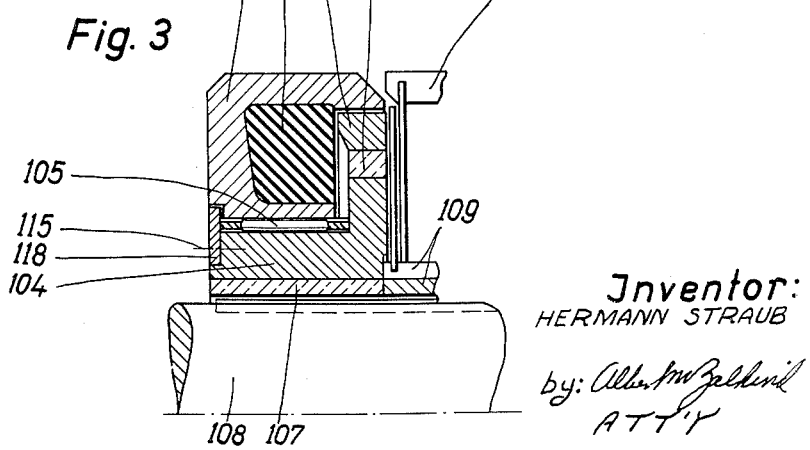
FIG. 3 is a longitudinal cross-section showing a modification.

Referring now to FIG. 3, a modification is disclosed wherein a magnet body 101 having a solenoid 102 and a flux-carrying member 103 which comprises a hub 104 is utilized. The magnet body 101 is carried by means of roller or needle bearing 105 which will be seen to be carried in a cage, of soft iron, precisely as cage 6 in FIG. 1, and wherein the cage is retained in position by a retainer ring 118 secured as generally indicated at 115 as by bolts similar to the bolts 15 of FIG. 1. The clutch elements 109 and 113 are indicated similar to clutch elements 9 and 13 of FIG. 1, as is the non-permeable spacer 110 separating the elements 103 and 104.

The distinction between the modification of FIG. 3 and the construction shown in FIG. 1 is in the elimination of the bearing races disposed inwardly and outwardly of the needle bearing cage. In this instance the surfaces against which the needle bearings bear to support radial load are suitably hardened for that purpose. Such surfaces are the outer periphery of hub 104 and the inner periphery of the bore within the magnet body 101. Thus, the magnetic flux path has a somewhat lowered reluctance by virtue of elimination of the bearing races.

Of course, the principle of using as few as possible rollers or needles will be understood to be utilized in the form of FIG. 3, so as to minimize the number of slots required through the cage and thus increase the cage area available for transmitting flux.

Having thus described my invention, I am aware that various changes may be made without departing from the spirit thereof and, accordingly, I do not seek to be limited to the precise illustration herein given except as set forth in the appended claims.

I claim:
1. In a magnetic clutch, a stationary magnet body having a solenoid, a bore through said solenoid, a power shaft through said bore, a non-magnetic sleeve on said shaft through said bore, a magnetic hub on said non-magnetic sleeve within said bore, a bearing device within said bore intermediate said magnetic hub and said magnet body, said hub having a flange of magnetic material extending radially therefrom and substantially within the confines of said magnet body, an outer marginal portion of said flange being separated from the inner portion of said flange by a spacing ring of non-magnetic material, said bearing device comprising a soft iron cage disposed with a minimum peripheral clearance between said magnet body and said magnetic hub and having slots, and needle bearings carried within said slots provided in said cage, the number of said bearings being only sufficient to carry the radial load imposed by said magnet body and said solenoid on said shaft, so as to effect a maximum radial flux path through said cage from said magnet body to said hub.

2. In a magnetic clutch, a stationary magnet body having a solenoid, a bore through said solenoid, a power shaft through said bore, a non-magnetic sleeve on said shaft through said bore, a magnetic hub on said non-magnetic sleeve within said bore, a bearing device within said bore intermediate said magnetic hub and said magnet body, said hub having a flange of magnetic material extending radially therefrom and substantially within the confines of said magnet body, said bearing device comprising a soft iron cage disposed with a minimum peripheral clearance between said magnet body and said magnetic hub and having slots, and needle bearings carried within said slots provided in said cage, the number of said bearings being only sufficient to carry the radial load imposed by said magnet body and said solenoid on said shaft, so as to effect a maximum radial flux path through said cage from said magnet body to said hub.

References Cited in the file of this patent

UNITED STATES PATENTS

| | | |
|---|---|---|
| 1,999,303 | Sarbey | Apr. 30, 1935 |
| 2,328,212 | Heiner | Aug. 31, 1943 |
| 2,401,003 | Lear | May 28, 1946 |
| 2,502,252 | Faile | Mar. 28, 1950 |
| 2,646,519 | Kalikow et al. | July 21, 1953 |
| 2,664,981 | D'Ozouville | Jan. 5, 1954 |
| 2,875,875 | Prahanser et al. | Mar. 3, 1959 |
| 2,893,528 | Ryba | July 7, 1959 |
| 2,946,419 | Ryba | July 26, 1960 |
| 2,966,975 | Wiedmann et al. | Jan. 3, 1961 |
| 2,989,161 | Diebold | June 20, 1961 |

FOREIGN PATENTS

| | | |
|---|---|---|
| 541,444 | Italy | Mar. 29, 1956 |
| 1,159,706 | France | July 1, 1958 |